ates Patent [19]  [11] 4,395,247
Roberts [45] Jul. 26, 1983

[54] SHAFT COUPLING
[75] Inventor: Derek A. Roberts, Bristol, England
[73] Assignee: Rolls-Royce Limited, London, England
[21] Appl. No.: 170,924
[22] Filed: Jul. 21, 1980
[30] Foreign Application Priority Data
Aug. 31, 1979 [GB] United Kingdom ............... 7930366
[51] Int. Cl.³ .............................................. F16D 3/18
[52] U.S. Cl. ................................... 464/158; 464/162; 464/182; 403/359
[58] Field of Search ............... 464/157, 158, 162, 182; 403/316, 359
[56] References Cited
U.S. PATENT DOCUMENTS

| | | | |
|---|---|---|---|
| 2,785,550 | 3/1957 | Petrie | 403/316 |
| 3,469,868 | 9/1969 | Freeman et al. | 403/316 |
| 3,602,535 | 8/1971 | Behning et al. | 403/316 |
| 3,900,270 | 8/1975 | Rhodes | 403/359 |
| 3,970,398 | 7/1976 | Wilson | 403/359 |
| 4,292,001 | 9/1981 | Snell | 403/359 |

Primary Examiner—Ira S. Lazarus
Attorney, Agent, or Firm—Parkhurst & Oliff

[57] ABSTRACT

A coupling between a hub (10) and a shaft (11) has first and second splines (512,513; 530,531) connecting the hub to the shaft. The first splines extend axially and are straight while the second splines are helical. A nut (521) on the shaft urges the hub axially toward a shoulder (527) on the shaft. The first and second splines, being of different helix angles, co-operate to urge the spline faces circumferentially into engagement to take up any clearance therebetween. The different helix angles also have the effect of limiting axial movement of the hub under the nut load. On application of the nut at an initial moderate torque the hub takes up an initial axial position. On further, more powerful, application of the nut, the hub is urged axially against the shoulder (527) which provides a final limit to movement of the hub thereby to avoid undue circumferential stress in the splines.

12 Claims, 6 Drawing Figures

SHAFT COUPLING

DESCRIPTION

This invention relates to shaft couplings.

According to this invention there is provided a shaft coupling comprising two relatively inner and outer members having a common axis, first surfaces provided on the respective members in circumferentially confronting relationship, second surfaces provided on the respective members in circumferentially confronting relationship, the first and second surfaces extending at different helix angles relative to said axis, screw means for urging the outer member axially along the inner member, said first and second surfaces co-operating to initially limit axial movement of the outer member along the inner member and to impart to the members opposing circumferential forces urging the members into engagement at said first and second surfaces respectively, an axially facing abutment provided on one of the members being abuttable by the other member under the action of the screw means to finally limit said axial movement.

The axially facing abutment makes it possible to tighten the screw means with substantial torque to ensure a secure clamping of the outer on the inner member while avoiding undue stress at the circumferentially confronting first and second surfaces.

Examples of this invention will now be described with reference to the accompanying drawings wherein.

Figure 1:
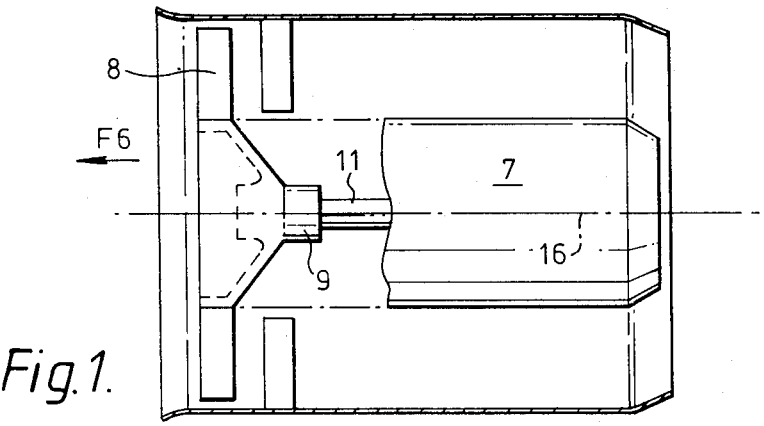
FIG. 1 is a diagrammatic side elevation of a gas turbine power plant embodying a shaft coupling according to this invention.

Referring to FIG. 1, the powerplant comprises a gas turbine engine 7 having an output shaft 11 connected to drive a fan 8 through a coupling 9.

Figure 2:
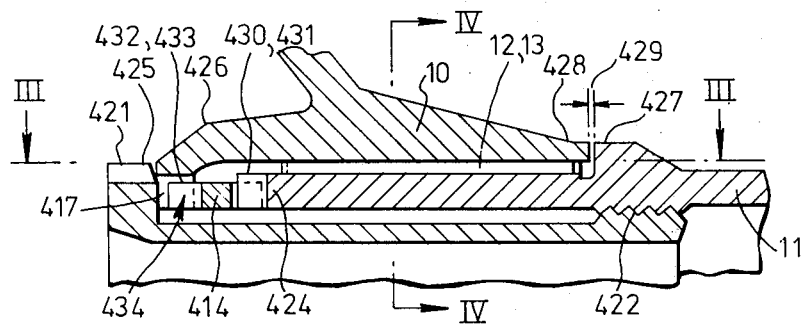
FIG. 2 is an enlarged sectional detail of FIG. 1.
Figure 3:
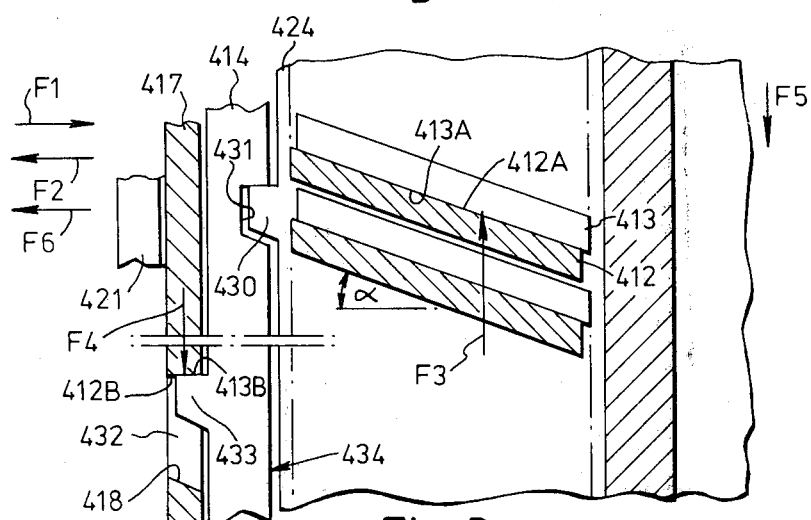
FIG. 3 is a developed sectional view on the line III—III in FIG. 2.
Figure 4:
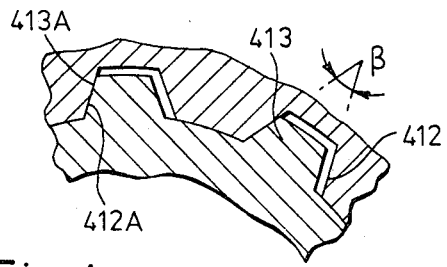
FIG. 4 is an enlarged section on the line IV—IV in FIG. 2.

Referring now also to FIGS. 2 to 4, the coupling 9 comprises an outer member or hub 10 having internal helical splines 412 interdigitated with external helical splines 413 of an inner member constituted by the shaft 11. The members 10,11 have a first pair of confronting surfaces being respectively helical surfaces 412A of the splines 412 and helical surfaces 413A of the splines 413. The surfaces 412A,413A are in direct engagement and transmit the torque of the shaft 11 to the hub 10. The surfaces 412A,413A have a helix angle α with the common axis 16 of the members 10,11 (FIG. 3). An annular member 414 is arranged between an end 424 of the shaft 11 and a flange 417 of the hub 10. The end 424 and flange 417 confront each other axially. The end 424 has two diametrally opposite axial projections 430 engaging corresponding recesses 431 in the member 414, and the latter has two diametrally opposite axial projections 433 engaging corresponding recesses 432 in the flange 417. The projections and recesses 433,432 have confronting surfaces 413B,412B which extend parallel to the axis 16, i.e. have a helix angle which is zero. The surfaces 412B,413B define second confronting surfaces of the members 10,11, the member 414 being in this context merely an extension of the member 11. However, the projections and recesses 430,431, which are in a plane perpendicular to the projections and recesses 433,432, are introduced to constitute, together with the projections and recesses 430,431, an Oldham coupling 434 for purposes described later herein.

A screw 421 engages a nut thread 422 in the shaft 11 and has a head 425 abutting the end 426 of the hub 10 adjacent a free end 424 of the shaft 11. The arrangement is such that when the screw 421 is tightened it applies to the hub 10 an axial force F1 reacted by an opposite force F2 of the shaft and urging the hub axially along the shaft. In view of their different helix angles, the surface 412A, 413A and 412B,413B co-operate to limit the axial movement of the hub under the action of the force F1. Further, the different helix angles produce a circumferential force F3 urging the surfaces 412A of the hub against the surfaces 413A of the shaft and an opposite circumferential force F4 transmitted through the member 414 between the surfaces 412B,413B. The forces F3,F4 eliminate any circumferential clearance between the surfaces 412A,413A which, as stated, transmit the torque of the shaft 11. A circumferential force F5 applied by the shaft to rotate the fan can therefore act on the hub without encountering any said clearance. A force F6, being the aerodynamic load on the fan 8, acts in the opposite sense to the force F2 applied by the screw. This means that the screw must be tightened with a relatively high torque to produce an adequate loading of the surfaces 412A,413A.

While the different helix angles of the surfaces 412A,413A and 412B,413B cause these surfaces to limit axial movement of the hub 410 under the force of the screw 421, the limitation is not a positive one because the force F3 can be relatively high and result in bending strain at the splines 412,413. To avoid undue such bending strain, and in any case to provide a positive abutment for the hub 10, the shaft 11 is provided with a shoulder 427 facing an end 428 of the hub remote from the end 426 thereof. The arrangement is such that the movement of the hub 10 under an initial, moderate, tightening of the screw 421 is limited by co-operation of the surfaces 412A,413A and 412B,413B to an initial position at which there is a gap 429 between the end 428 and the shoulder 427. Further tightening of the screw 421 results in closing of the gap 429 accompanied by a bending strain of the splines 412,413. The gap 429 and the final torque on the screw 421 are so chosen that said strain is within acceptable limits while the position of the hub is finally limited by the shoulder 427. The nut thread 22 is relatively remote from the end 424 of the shaft to avoid tensile stress in the shaft when the screw is tightened.

Reverting to the Oldham coupling 434, it will be appreciated that the hub 10 must be free to adopt the radial position demanded by the shaft 11 and that there is a danger that the surfaces 412B,413B may interfere with the free accommodation of the hub splines 412 on the shaft splines 413. This is especially so if the splines are tapered as shown by the angle β in FIG. 4. The Oldham coupling 434 allows this accommodation. The member 414 is free axially to avoid being clamped between the end 424 and the flange 417. The recesses 432 are cut back as at 418 to facilitate assembly and disassembly.

Figure 5:
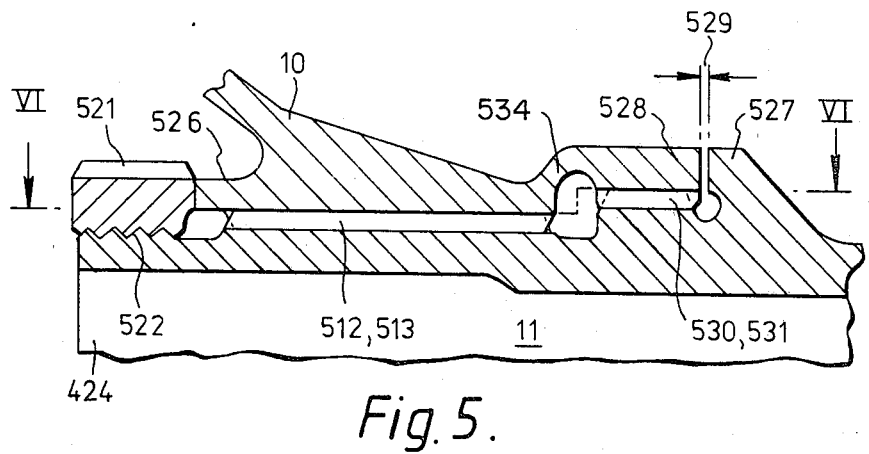
FIG. 5 is a view similar to FIG. 2 but showing a modification.
Figure 6:
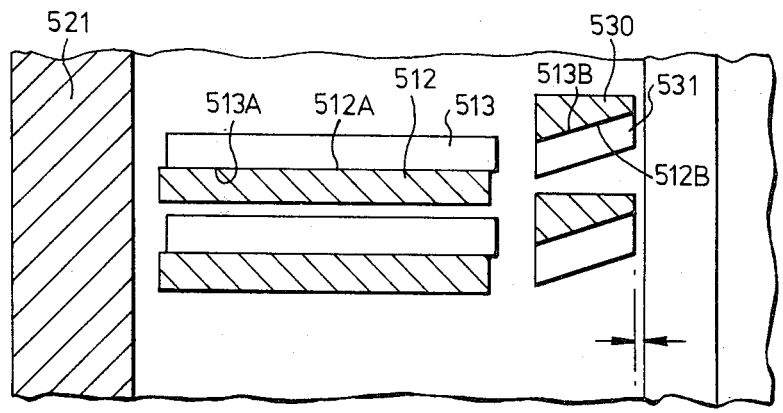
FIG. 6 is a developed sectional view on the line VI—VI in FIG. 4.

In FIGS. 5 and 6, the hub 10 has internal splines 512 interdigitated with external splines 513 of the shaft 11.

The splines 512,513 are straight axial splines, and have torque-transmitting first surfaces 512A,513A respectively. The hub 10 has ends 526,528 situated respectively adjacent a free end 424 of the shaft and a shoulder 527 provided on the shaft. The shoulder 527 faces the end 528 of the hub across a gap 529. Adjacent its end 528 the hub has internal splines 530 interdigitated with external splines 531 of the shaft. The splines 530,531 are helical and define confronting second surfaces 512B,513B. When a nut 521, engaging a screw thread 522 on the shaft, is tightened with moderate torque an initial engagement between the surfaces 512A,513A and 512B,513B limits the axial position of the hub to that defining the gap 529. On further tightening of the nut, the gap 529 closes and the shoulder 527 provides a positive or final limit for the position of the hub. The splines 531 have axial cut-away portions 531A to facilitate assembly and disassembly of the hub. The hub 10 may have a weakened portion 534 between the splines 512,530 to avoid radial interference between the splines 512,513 and 530,531 in a manner corresponding to the function of the Oldham coupling 434 described with reference to the FIGS. 2 to 4.

I claim:

1. A coupling comprising relatively inner and outer members having a common axis, the members being provided with intermeshing splines that have one or more pairs of circumferentially confronting first surfaces, each of the members additionally provided with one or more circumferentially confronting second surfaces spaced from the said first surfaces and extending at an angle relative to the first surfaces, an axially facing abutment distinct from both the first and second surfaces provided on a first of the members, the abutment being positioned relative to the second member so that the second member can abut against it, displaceable means for allowing relative radial displacement between the first and second surfaces of at least one of the inner or outer members, and urging means for urging the first member along the common axis relative to the second member, the urging means being operable to move the first member to an initial position where the first and second surfaces are urged into contact with each other and opposing circumferential forces are imposed on the first and second members and being operable to move the first member to a final position where the first member abuts the abutment.

2. A coupling according to claim 1 wherein the first surfaces extend at an angle to the common axis.

3. A coupling according to claim 1 wherein the first surfaces extend in the same direction as the common axis.

4. A coupling according to claim 1 wherein the second surfaces extend in the same direction as the common axis.

5. A coupling according to claim 1 wherein the second surfaces are mutually confronting and in operation contact with each other.

6. A coupling according to claim 1, said inner member having a free end, said abutment being provided on the inner member remote from said free end thereof, said outer member being situated on a part of the inner member between said free end and said abutment.

7. A coupling according to claim 6 wherein said urging means comprises a screw engaging a nut thread in the interior of the inner member and having a head engageable with the outer member adjacent said free end of the inner member.

8. A coupling according to claim 7 wherein said nut thread is provided in a part of the inner member remote from said free end by an amount not substantially less than the axial length of said part of the inner member between said free end and said abutment.

9. A coupling according to claim 6, said urging means comprises a nut arranged on a screw thread on the inner member adjacent said free end thereof.

10. A coupling according to claim 1 wherein said radial displaceable means comprise an Oldham coupling between said members.

11. A coupling according to claim 1 wherein said displaceable means comprises a relatively weakened portion in one of the members between said spaced apart portions thereof.

12. The shaft coupling of any one of claims 1-5, 6-9, 10 or 11, wherein said outer member has an initial axial position and a final axial position and wherein said axially facing abutment is located on said inner member and said inner and outer members are dimensioned so that the initial axial position of the outer member is limited by the engagement of the first and second surfaces so that there is a gap between said axially facing abutment and said outer member, said gap being sized to become closed in said final axial position when the screw means are applied to abut said outer member with said axially facing abutment to finally limit the axial position of the outer member.

* * * * *